United States Patent
Shiue

(10) Patent No.: US 6,479,184 B1
(45) Date of Patent: Nov. 12, 2002

(54) PDA BATTERY BUCKLING DEVICE

(75) Inventor: Jih-Jonq Shiue, Tucheng (TW)

(73) Assignee: High Tech. Computer Corp., Taoyuan (TW)

( * ) Notice: Subject to any disclaimer, the term of this patent is extended or adjusted under 35 U.S.C. 154(b) by 129 days.

(21) Appl. No.: 09/589,741

(22) Filed: Jun. 9, 2000

(51) Int. Cl.⁷ .......................... H01M 10/38; H01M 2/10
(52) U.S. Cl. ........................ 429/123; 429/96; 429/97; 429/100
(58) Field of Search ..................... 429/123, 96, 97, 429/100

(56) References Cited

U.S. PATENT DOCUMENTS 5,505,635 A * 4/1996 Willows et al. ............. 439/500
5,716,730 A * 2/1998 Deguchi ...................... 429/97
6,114,625 A * 9/2000 Hughes et al. ............. 174/52.1
6,274,266 B1 * 8/2001 Wang .......................... 429/163

* cited by examiner

Primary Examiner—Patrick Ryan
Assistant Examiner—Julian A. Mercado
(74) Attorney, Agent, or Firm—Rosenberg, Klein & Lee

(57) ABSTRACT

A PDA battery buckling device has a battery housing. An embedding room is installed in a PDA main frame with an actuation switch, a circuit board and a plurality of power receiving joints therewithin. A lower side of the embedding room has a transversal plate installed with a positioning groove. A positioning protrusion is installed at the bottom plate of the battery housing capable of buckling with the transversal plate. A hook case installed within the battery housing has a plurality of slots for being buckled by power supplying joints therein. After the hook case is hooked in the embedding room, a wedge plate at the lower side of the battery housing is pushed to tightly clamp the transversal plate of the embedding room for connecting power supplying joints and the power receiving joints.

10 Claims, 13 Drawing Sheets

PDA BATTERY BUCKLING DEVICE

FIELD OF THE INVENTION

The present invention relates to a personal digital assistant (PDA) battery buckling device, and especially to a PDA battery buckling device, thereby, the turning off and on of the PDA can be neglected, the present invention can be used in Gameboys (palm type game machine) and other digital devices.

BACKGROUND OF THE INVENTION

In the prior art PDA 10, a button 11 is necessary to be pressed for turning on (referring to FIG. 1) so as to display the frame of the display screen 12. If the operation is complete, after the cursor 13 selects an item in the screen 12, the button 11 is necessary to be pressed again for turning off. The process is complex (moreover, a touch controlled pen is used to press the screen). Next, the batteries used in PDA is an built-in type design (see FIG. 2). After the battery 20 is placed in the battery room 14, a battery cover 15 is necessary to cover thereon so that all the battery may keep in contact with the joints in the PDA 10 so that current will lose so as to reduce the power supplying period.

SUMMARY OF THE INVENTION

Accordingly, in order to improve the defects in the present invention, the present invention provides a PDA battery buckling device having a battery housing. An embedding room is installed in a PDA main frame. The embedding room is formed with an actuation switch and a circuit board with a plurality of power receiving joints therewithin. A lower side of the embedding room has a transversal plate installed with a positioning groove; the battery housing comprises a wedge plate, a driving plate, an inner battery casing, an outer battery casing, an elastomer, and a battery and a circuit board having a plurality of power supplying joints. A positioning protrusion is installed at the bottom plate of the battery housing, which is capable of buckling with the transversal plate at the lower side of the embedding room. A hook case is installed at the rear side of the battery, which is capable of being engaged with the upper transversal plate of the embedding room. Another, the top of the hook case is installed with a plurality of slots for being passed and buckled by the power supplying joints.

In the present invention, by the wedge plate to control the position of the driving plate, after the hook case of the present invention is hooked to the embedding room, the wedge plate at the lower side of the battery housing is pushed. The wedge plate and the bottom plate of the battery housing can tightly clamp the transversal plate of the embedding room for being connected by the power supplying joints and power receiving joints.

Meanwhile, the lateral plate of the driving plate is moved upwards for actuating an actuation switch. On the contrary, the lateral plate of the driving plate moves downwards, the wedge plate separates from the transversal plate of the embedding room. Then, the battery housing can be taken out to turn off the actuation switch.

Therefore, the present invention has the following advantages:

1. The user can detach/attach the battery housing from the PDA as pleasure for neglecting the operations of turning on or off.
2. The battery housing has a secondary battery, after the battery is reversed, the power supplying joints will contact with the power receiving joints for charging.
3. After the battery housing is detached, the power is sustained without lose.
4. The buckling structure of the battery housing is very simple with less components so that the cost is low.

The various objects and advantages of the present invention will be more readily understood from the following detailed description when read in conjunction with the appended drawing.

DETAILED DESCRIPTION OF THE PREFERRED EMBODIMENTS

The functions, features, and technology of the present invention will be described in the following description hereinafter with the appended figures. However, the description and figures are used to cause those skilled in the art to understand the present invention fully, no to confine the spirit and scope of the present invention defined in the appended claims.

Figure 1:
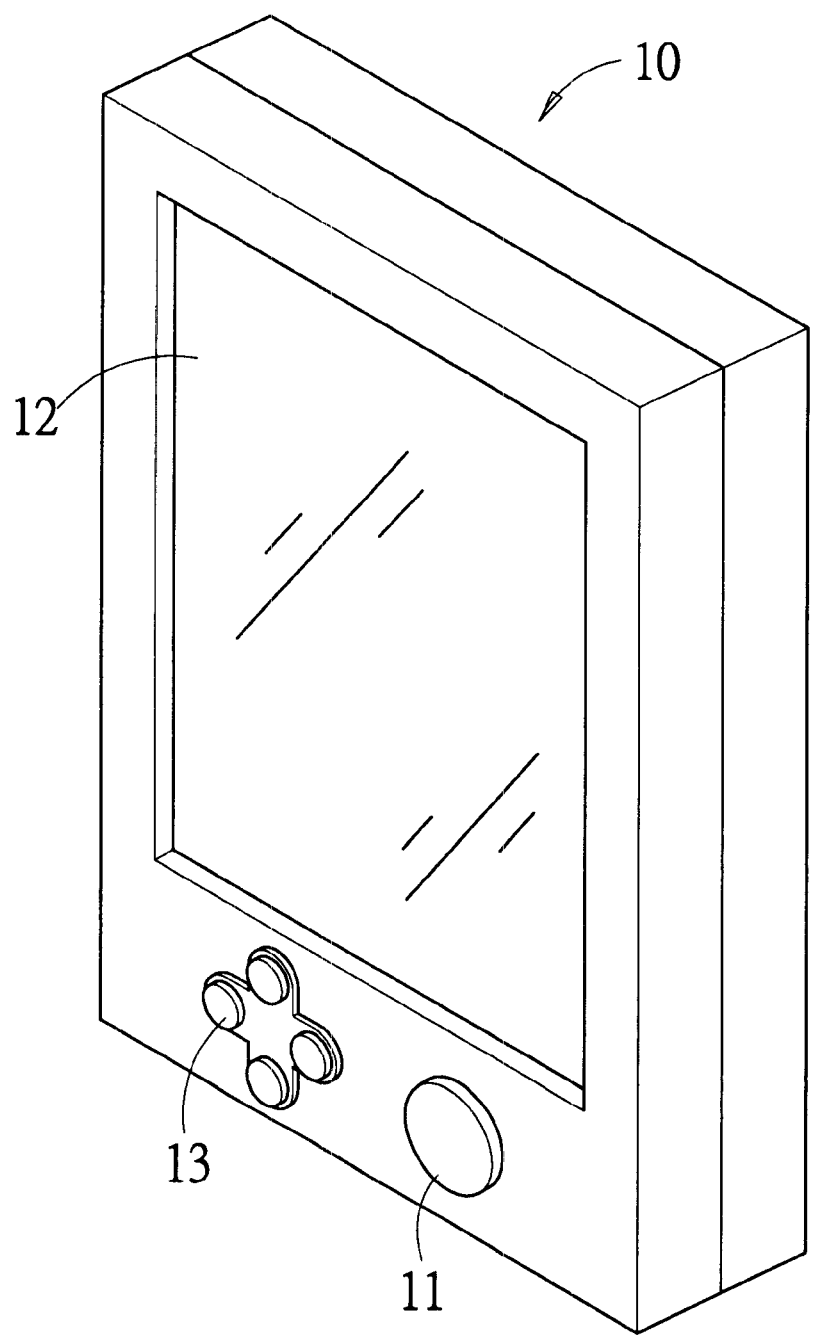
FIG. 1 is a perspective view of a prior art PDA.
Figure 2:
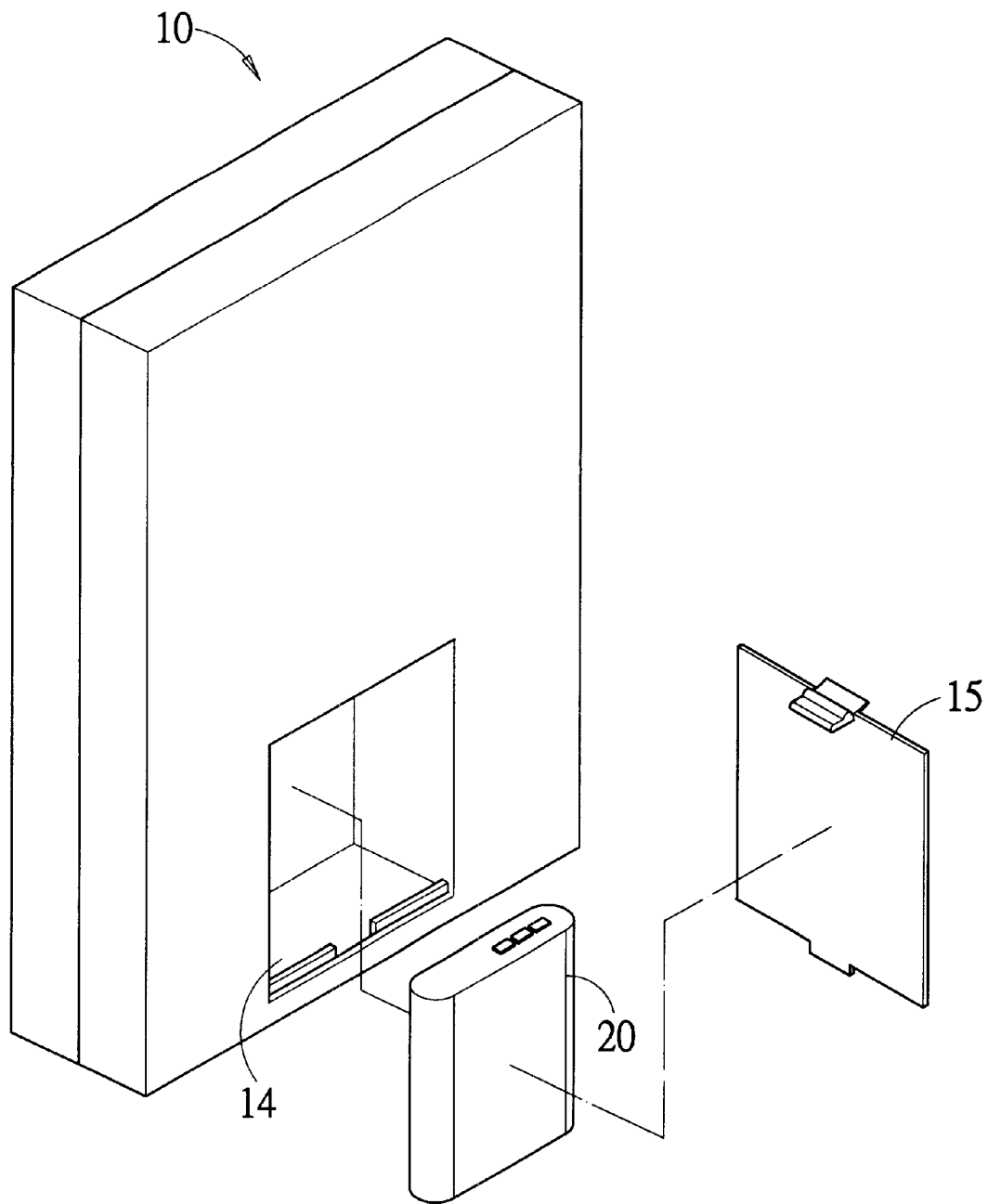
FIG. 2 is an exploded perspective view showing the rear side of a prior art PDA in which the battery has been detached.
Figure 3:
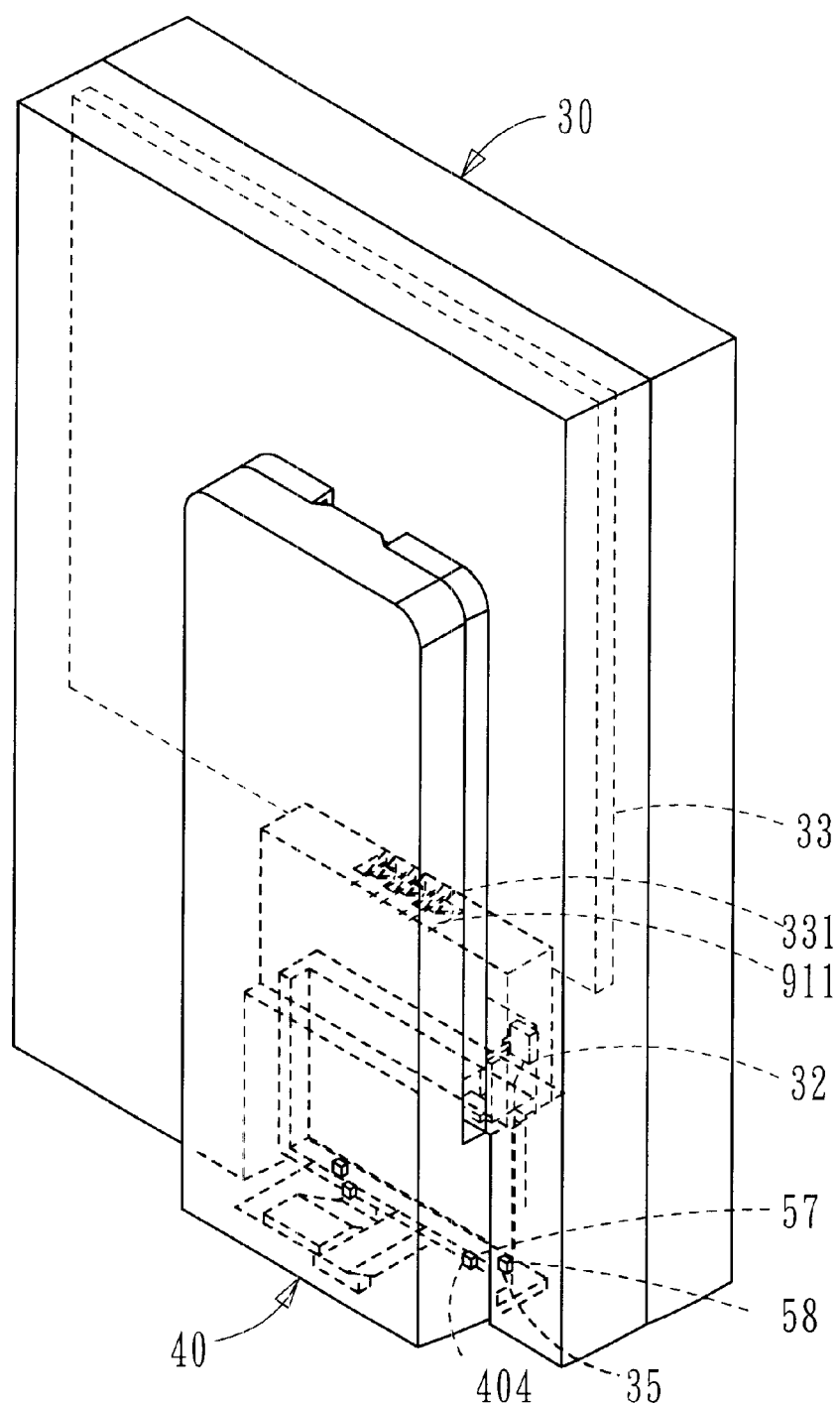
FIG. 3 is a perspective view of the PDA battery buckling structure in the present invention.
Figure 4:
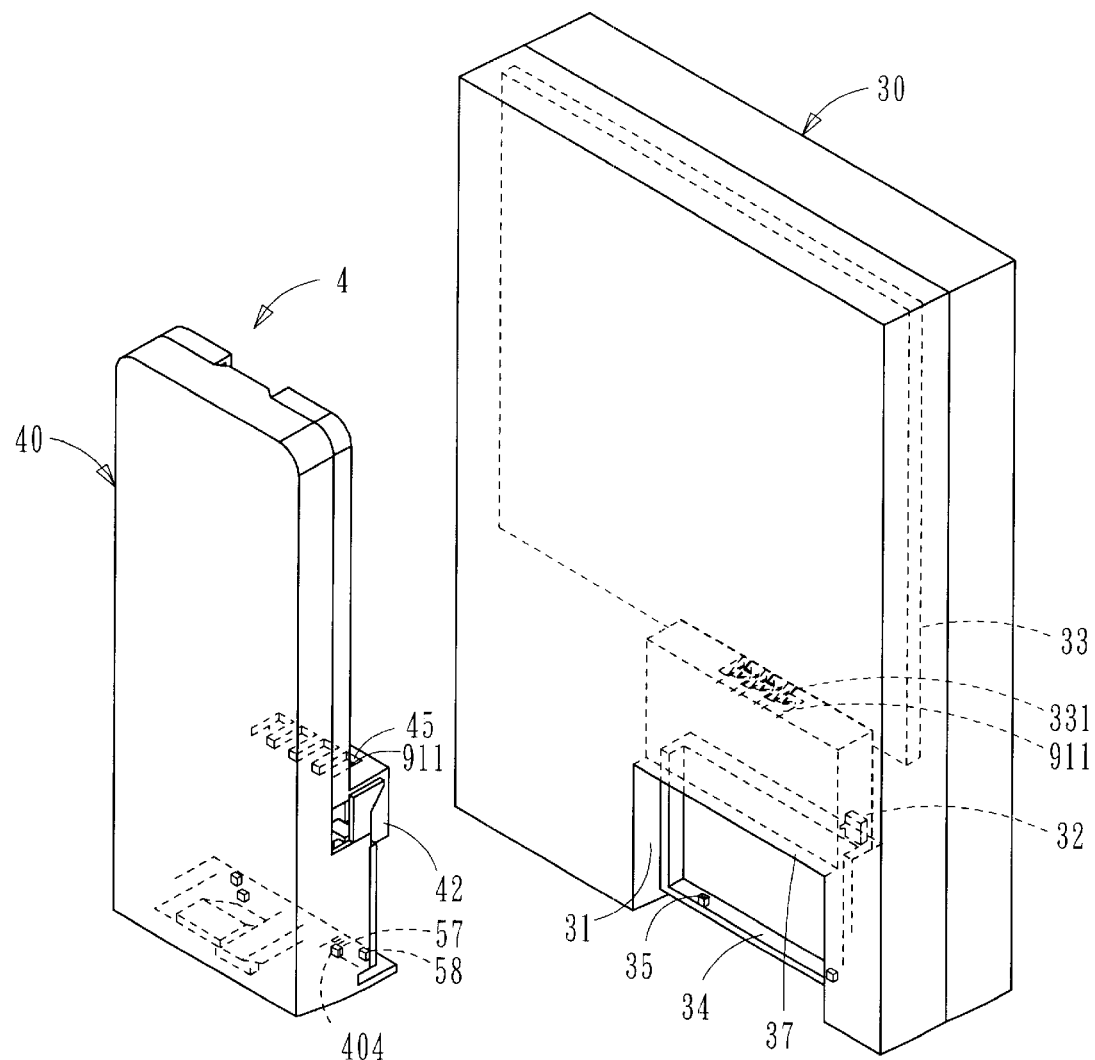
FIG. 4 is an exploded perspective view of the PDA battery buckling structure in the present invention.
Figure 5:
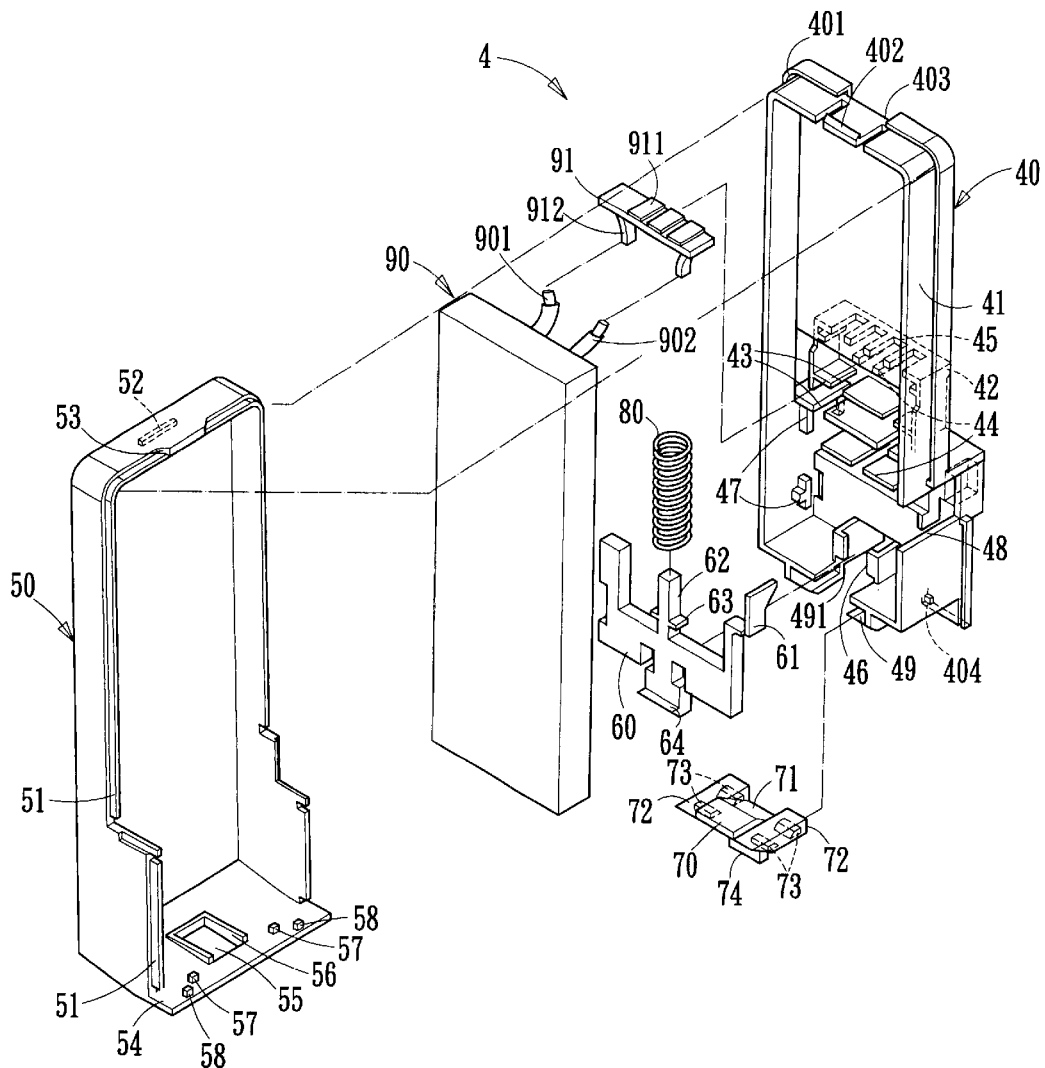
FIG. 5 is an exploded perspective view of the battery housing according to the present invention.

With reference to FIGS. 3 and 4, the perspective view and exploded perspective view of the PDA battery buckling device according to the present invention is illustrated. A PDA battery buckling device is disclosed in the figure. At the back side of a PDA main frame 30 is installed with a engaging room 31. The engaging room 31 is installed with an actuation switch 32 and a circuit board 33 with a plurality of power receiving joints 331. Positioning grooves 35 is formed in the cross plate 34 at the lower side of the engaging room 31. The battery housing 4 (see FIG. 5) has an inner battery casing 40 and an outer battery casing 50. Within the inner battery casing and outer battery casing is installed with a driving plate 60, a wedge plate 70, an elastomer 80, a battery 90 and a circuit board 91 with a plurality of power supplying joints 911. A half case with a positioning groove 401 is disposed near the bottom of the outer lateral wall 41 of the inner battery casing 40. This positioning groove 401 serves to be embedded by the embedded tenon 51 of the outer battery casing 50. A tenon 52 is installed at the top of the outer lateral wall 41. This tenon 402 may be buckled to the buckling hook 52 in the top of the outer battery casing 50. A notch 403 is arranged at the rear end of the top of the outer lateral wall 41 in the inner battery casing 40. This notch 403 may be engaged with the protrusion 53 at the top of the outer battery casing. A hook case 42 extends from the rear side of the notch 403. A plurality of parallel spacer 44 with notch 43 is installed in the hook case 42 for being passed through by the pin 912 and power wires 901 and 902. A plurality of slots 45 are formed at the top of the hook case 42 for being passed by and positioning the circuit board 91 of the power supplying joint 911. Moreover, a sliding track 46 is installed at the lower portion of the inner battery casing 40. Two stoppers 47 are formed at a deeper portion at one lateral wall below the inner battery casing 40. A notch 48 is installed at the opposite lateral wall. This notch 48 serves to be slid by the lateral plate 61 of the driving plate 60. One lateral plate 61 of the driving plate 60 can run across the lateral wall 48. A sliding groove 49 is arranged at the bottom of the inner battery casing 40 for being slid by the wedge plate 70. The distal end of this sliding groove 49 is disposed with a positioning tenon 491 which serves to buckle with the positioning groove 73 below the wedge plate 70.

The outer battery casing 50 is a half casing capable of being buckled with the inner battery casing. The peripheral of the outer battery casing 50 is installed with embedding tenon 51 and a buckling trench 52 is installed at the inner side of the top surface. A protrusion 53 is installed at the front end of the top surface. A through hole 55 of the wedge plate is installed on the bottom plate 54 of the outer battery casing 50. The rear three sides of the through hole 55 are installed with sealing strips 56, respectively. After the inner battery casing 40 and the outer battery casing 50 are buckled, the cambered bottom plate 54 will be tightly sealed so that the interior of the battery housing 4 can not be seen through the through hole 55 of the wedge plate. Next, the front end of the bottom plate 54 is installed with two sets of positioning protrusions 57 and 58. Thus, the positioning protrusion 57 can buckle with the buckling groove 404 below the inner battery casing 40. The positioning protrusion 58 may buckle with the positioning groove 35 in the hook case below the PDA.

The driving plate 60 is a "止" (a Chinese word) shape movable plate. One lateral side of the driving plate 60 first extends outwards with a bent lateral plate 61. The middle plate 62 of the driving plate 60 is installed with a supporting plate 63. The bottom of the driving plate 60 is installed with a protrusion 64.

A tilt groove 71 is at the top surface in the middle of the wedge plate 70 and two sides thereof have sliding plates with sliding strips 72. The lower side of each sliding strip 72 is installed with two pairs of positioning grooves 73 conformed to the positioning tenons 491. The lower side at the middle of the wedge plate 70 is installed with a movable plate 74 for being moved by the user.

The elastomer 80 is a compressible elastomer.

The battery 90 is a rechargeable secondary battery. The rear side of the battery 90 is led with a positive power wire 901 and a negative power wire 902 which are connected to the two pins 912 on the circuit board 91. A plurality of power supplying joints 911 are installed above the circuit board 91. This circuit board 91 may be inserted to the above parallel spacers 44 so that the power supplying joints 911 pass through the slot 45 at the top of the hook case 42. Moreover, the battery 90 can be placed in the battery housing.

Figure 6:
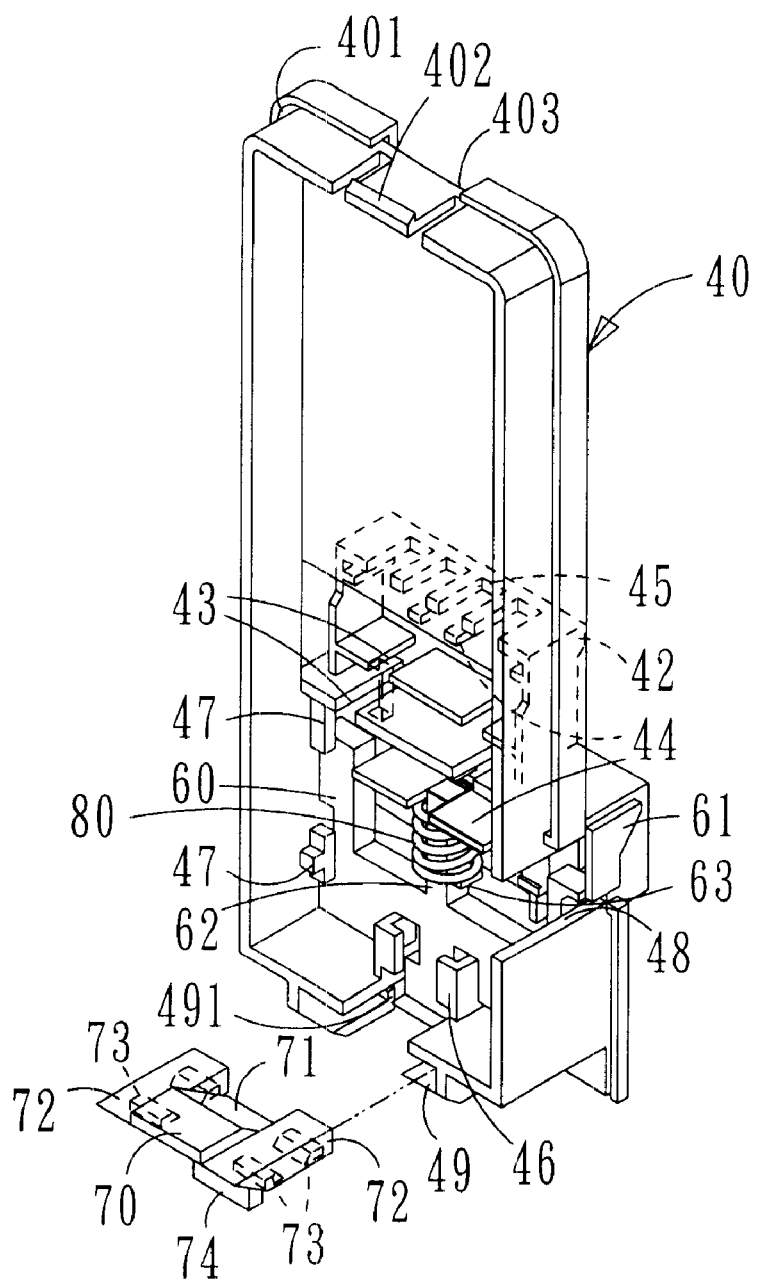
FIG. 6 is a perspective view showing the elastomer and driving plate of the present invention being placed in an inner battery casing.
Figure 7:
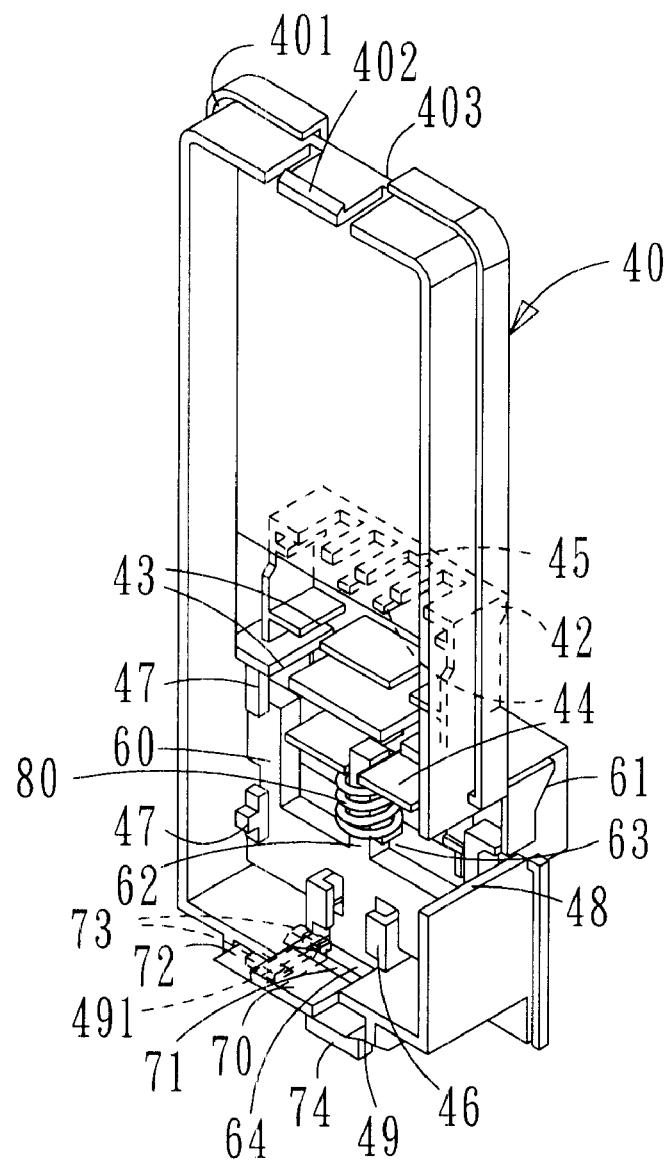
FIG. 7 is a perspective view showing the elastomer, driving plate, and wedge plate of the present invention being placed in an inner battery casing.
Figure 8:
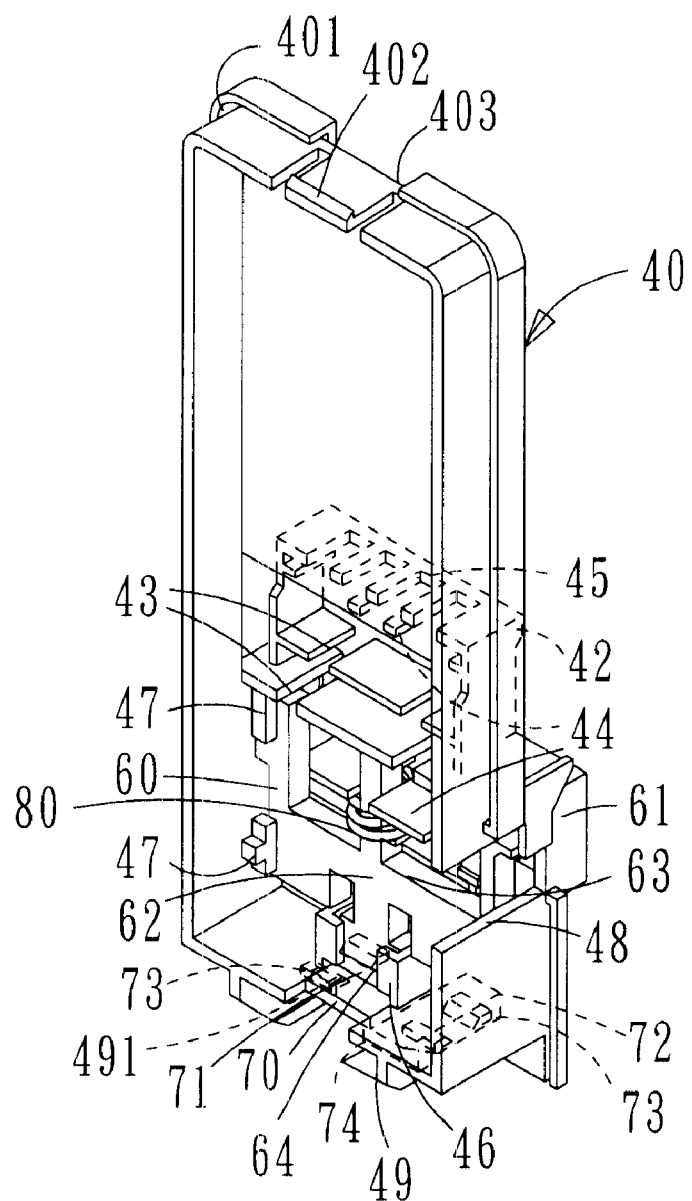
FIG. 8 is a perspective view of FIG. 7, in which the wedge plate is pushed.

With reference to FIG. 6, the perspective view showing that the elastomer and driving rod of the present invention is placed in the inner battery casing is illustrated. It is disclosed in the figure that the elastomer 80 has one end capable of being engaged with the middle plate 62 of the driving plate 60 and then running across the supporting plate 63. Then another end of the elastomer 80 is pressed down for placing the driving rod in the inner battery casing 40 and causing another end of the elastomer 80 to resist against the parallel spacer 44 at lower side thereof. Then the sliding strip 72 of the wedge plate 70 is inserted into the sliding groove 49 (as shown in FIG. 7) and the rear positioning groove 73 is buckled with the positioning tenon 491. By the force applied from the elastomer 80, the tilt protrusion 64 is in contact with the tilt groove 71 for assuring the lateral plate 61 of the driving plate 60 in a lower accurate position. Then, the driving plate 60 is confined by the stopper 47 and the sliding track 46. If the movable plate 74 can be pushed backwards (as shown in FIG. 8), the front positioning groove 73 may be buckled with the positioning tenon 491. The tilt groove 71 will slide to enforce the protrusion 64 to lift up with the driving rod 60 for assuring that the lateral plate 61 of the driving plate 60 is in a higher accurate position.

Figure 9:
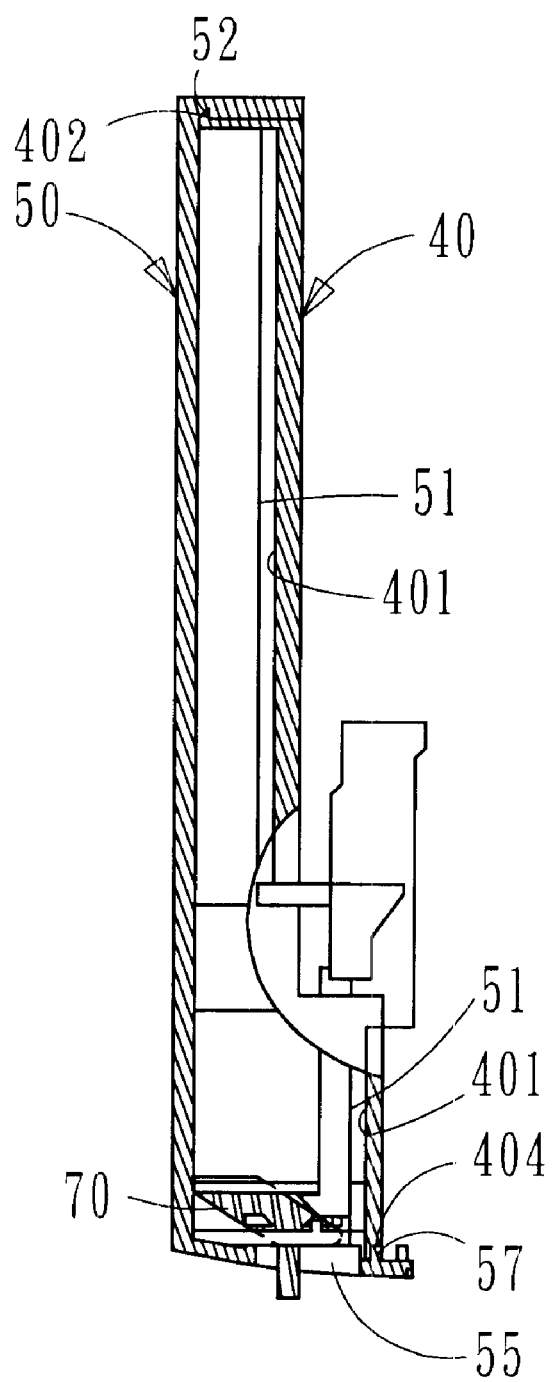
FIG. 9 is a lateral cross sectional view showing the engagement of the inner battery casing and the outer battery casing of the present invention.

As shown in FIG. 9, the lateral cross sectional view about the buckling of the inner battery casing and the outer battery casing according to the present invention is illustrated. It is disclosed in the figure that in the combination of the inner battery casing and the outer battery casing, the buckling groove 404 at the lower side of the inner battery casing 10 is in advance buckled to the lower positioning protrusion 57 of the outer battery casing 50. Then, the upper portion of the inner battery casing 40 is pushed into the upper portion of the outer battery casing 50 so that the embedded tenon 51 enters into the positioning groove 401 and the tenon 402 is capable of buckling the buckling trench 52.

Figure 10:
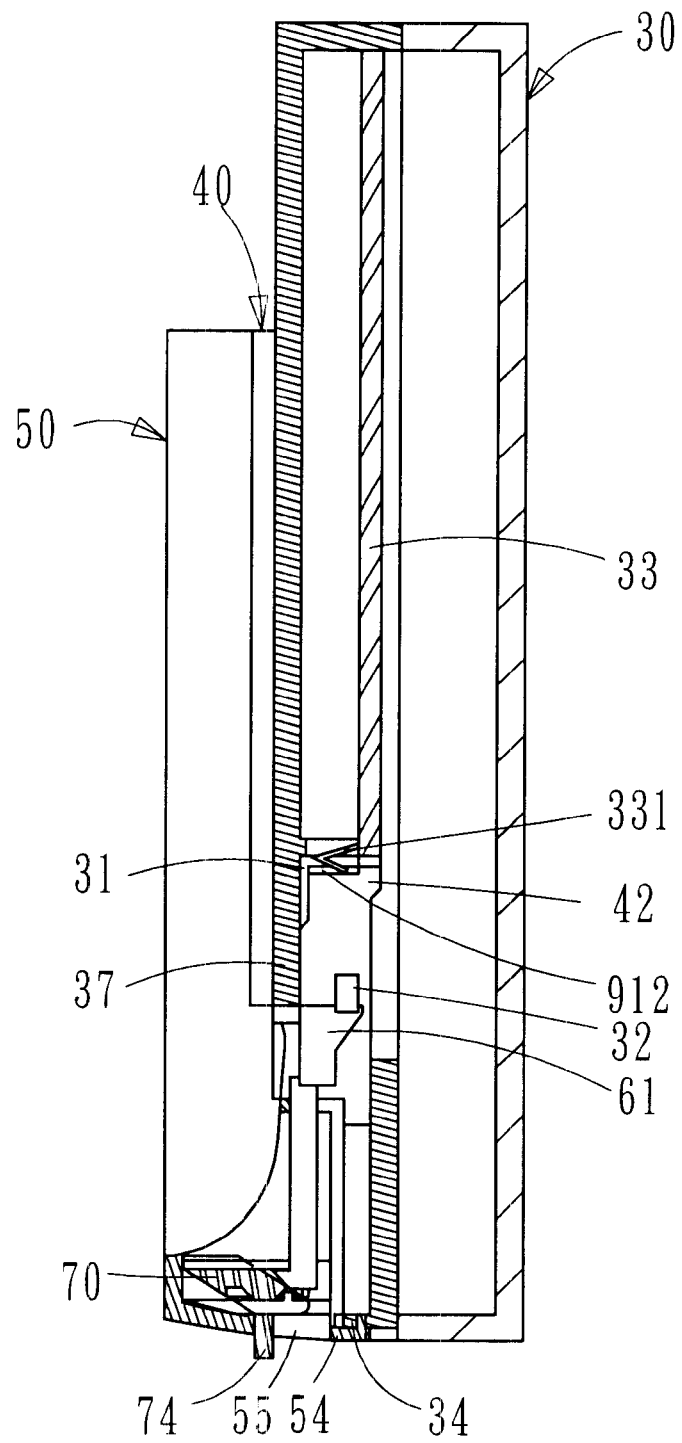
FIG. 10 is a lateral cross sectional view showing the battery housing of the present invention being buckled with a PDA.
Figure 11:
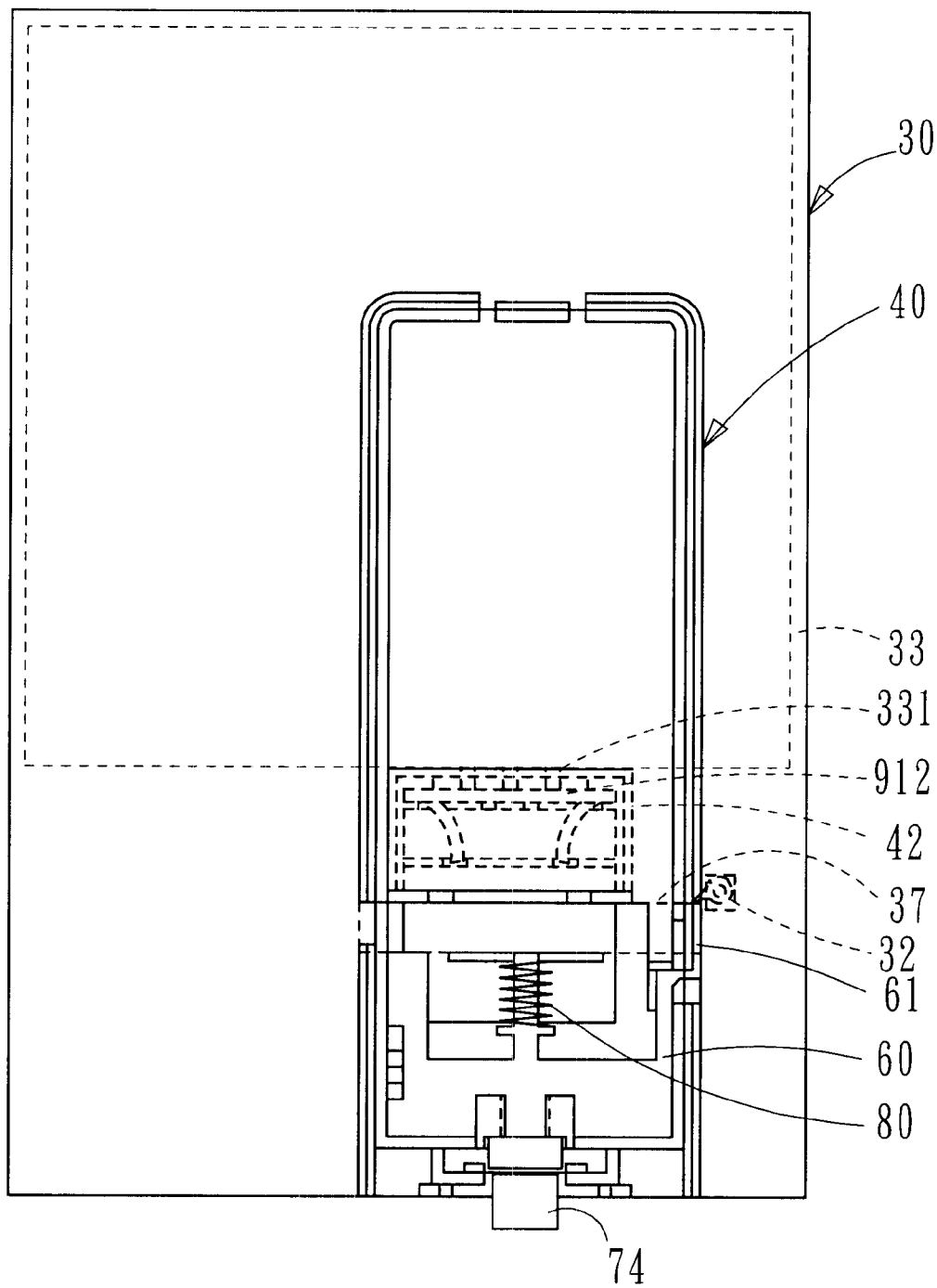
FIG. 11 is a front view of FIG. 10 in which the outer battery casing is removed.

As shown in FIG. 10, a lateral cross sectional view showing that the battery housing and the PDA are buckled. It is disclosed in the figure that the hook case 42 of the inner battery casing 40 is hooked across the upper wall plate 37 of the embedding room 31 of the PDA main frame 30 and the power supplying joint 912 is capable of being connected to the power receiving joint 331 of the circuit board 33. Moreover, the power can be supplied to all the circuit in the PDA main frame 30. The bottom in the upper portion of the inner battery casing 40 can be adhered to the rear surface of the main frame 30. Then the movable plate 74 is not moved so that the lateral plate 61 of the driving plate 60 can not touch the actuation switch 32 (see FIG. 11).

Figure 12:
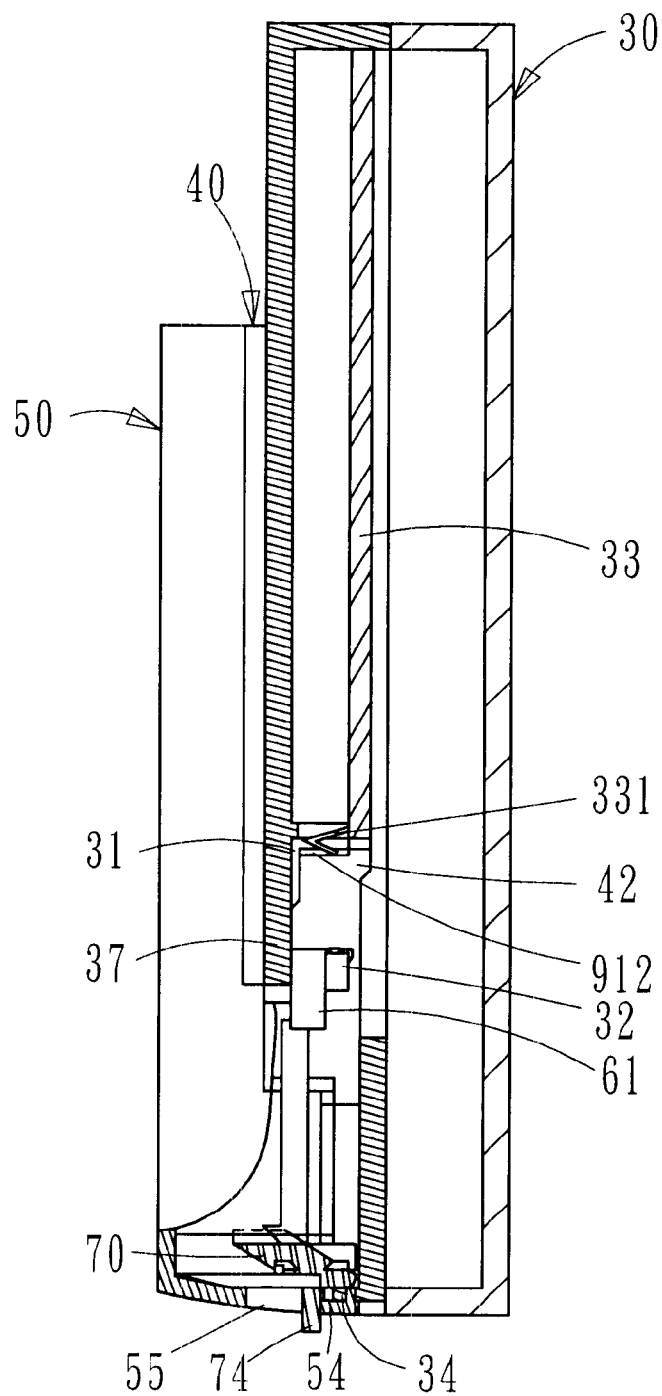
FIG. 12 is a lateral cross sectional view showing that the battery housing of the present invention is buckled with the PDA and then the wedge plate is pushed.
Figure 13:
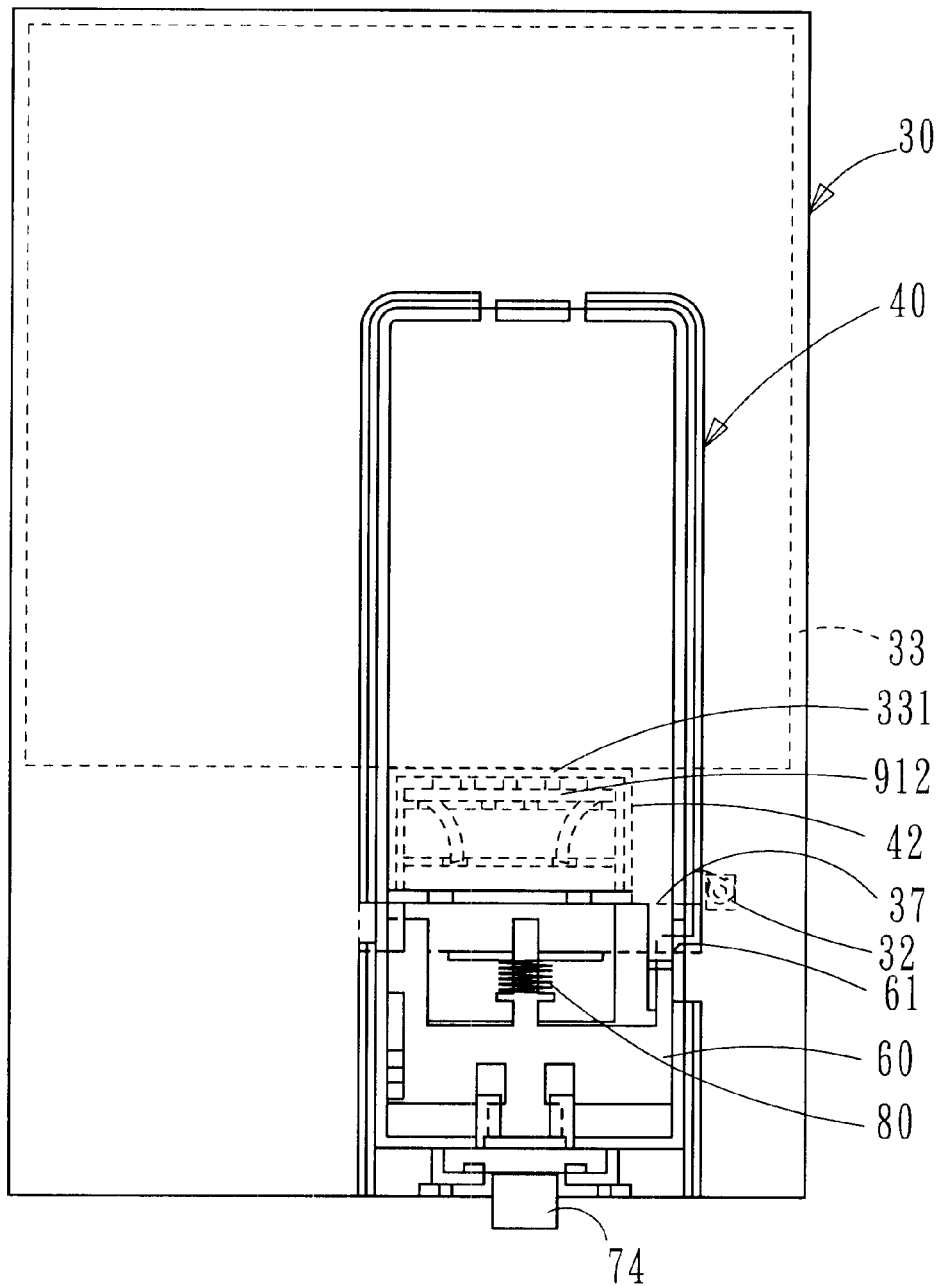
FIG. 13 is front view of FIG. 12 in which the outer battery casing is removed.

As shown in FIG. 12, a lateral cross sectional view showing that the battery housing of the present invention is buckled with the PDA and then the wedge plate is pushed. Continuing from the aforesaid actions, firstly, the wedge plate 70 is pushed so that the wedge plate 70 and the bottom plate 54 of the battery housing may tightly clamp the transversal plate 34 in the embedding room so as to assure that the power supplying joint 912 are connected with the power receiving joint 331 and thus, the battery housing 4 can not separate from the embedding room 31. Since the wedge plate 70 pushes the lateral plate 61 of the driving plate to move upwards for actuating the actuation switch 32 (see FIG. 13), and then the display screen is actuated. If the wedge plate 70 is restored, then after the battery housing 4 is taken out, the actuation switch 32 is turned off.

In summary, the present invention discloses a PDA battery buckling device, in that at the time of attaching and detaching the battery housing, the operations of turning on the off are completed with the attaching and detaching operation. The operations of purely turning off and on are not performed singly.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A PDA battery buckling device having a battery housing, in that an embedding room is installed in a PDA main frame, the embedding room is formed with an actuation switch and a circuit board with a plurality of power receiving joints therewithin, a lower side of the embedding room having a transversal plate installed with a positioning groove; the battery housing comprising;

a wedge plate being a sliding plate having a middle portion and two sides, the middle portion having a top surface having a tilt groove and two sides having respective sliding strips, a lower middle portion of the wedge plate being installed with a movable plate;

a driving plate being a movable plate having an outer lateral edge extending with a bent lateral plate;

an inner battery casing extending with a half case with hook case, a top of the hook case being installed with a plurality of power supplying joints, a lower portion of the inner battery casing being installed with a sliding track for positioning the driving plate, and a lateral wall at opposite sides being installed with a notch for being slid by the lateral plate of the driving plate, a bottom of the inner battery casing being suspended with a sliding groove for placing the wedge plate;

an outer battery casing being a half case for being combined with the inner battery casing, the outer battery casing having a bottom plate formed with a through hole;

an elastomer having an end resisting against the driving plate, and having another end resisting against a parallel spacer of the inner battery casing; and a battery for supply power to the power receiving joints;

wherein after the battery housing is placed in the embedding room at a rear side of the PDA main frame, the power supplying joints arc in contact with the power receiving joints; then, by the wedge plate to control the location of the driving plate so that the wedge plate and the battery housing is capable of clamping or releasing the transversal plate, at the same time, the wedge plate cause the lateral plate of the driving plate to move upwards or downwards for turning on or off the actuation switch.

2. The PDA battery buckling device as claimed in claim 1, wherein two stoppers are installed at one lateral wall of the lower portion of the inner battery casing for confining the driving plate.

3. The PDA battery buckling device as claimed in claim 1, wherein a tenon is disposed at an outer side of a top of the inner battery casing, and a buckling trench matched with the tenon is installed at an inner side of a top of outer battery casing.

4. The PDA battery buckling device as claimed in claim 1, wherein a positioning tenon is installed at a distal end of the sliding groove, and the lower end of the sliding strips are respectively installed with a pair of positioning grooves matching with the positioning tenon.

5. The PDA battery buckling device as claimed in claim 1, wherein three sides of a rear portion of the through hole are installed with sealing strips, respectively, so that the interior of the battery housing cannot be seen through a through hole of the wedge plate.

6. The PDA battery buckling device as claimed in claim 1, wherein a half case with a positioning groove is disposed near a bottom of an outer lateral wall of the inner battery casing and an engaging tenon is installed at a periphery of the outer lateral wall.

7. The PDA battery buckling device as claimed in claim 1, wherein the driving plate has a supporting plate at a middle portion thereof; the supporting plate serving to support one end of the elastomer.

8. The PDA battery buckling device as claimed in claim 1, wherein a notch is formed at a top of the inner battery casing, and a protrusion matched with the notch is disposed at a top of the outer battery casing.

9. The PDA battery buckling device as claimed in claim 1, wherein a front and a rear positioning protrusion are formed at the front end of the bottom plate, the rear positioning protrusion is capable of buckling with a buckling groove at a bottom side of the inner battery casing, and the front positioning protrusion is capable of buckling with a positioning groove in the embedding room.

10. The PDA battery buckling device as claimed in claim 1, wherein a tilt protrusion is installed at a bottom of the driving plate.

* * * * *